United States Patent [19]
Tophinke et al.

[11] Patent Number: 5,556,337
[45] Date of Patent: * Sep. 17, 1996

[54] SELF-PROPELLING HARVESTER THRESHER

[75] Inventors: Franz Tophinke; Josef Stovesand; Franz Heidjann; Johannes Dammann, all of Harsewinkel, Germany

[73] Assignee: CLAAS OHG beschraebkt haftende offene, Harsewinkel, Germany

[*] Notice: The term of this patent shall not extend beyond the expiration date of Pat. No. 5,454,758.

[21] Appl. No.: 414,806

[22] Filed: Mar. 31, 1995

Related U.S. Application Data

[63] Continuation-in-part of Ser. No. 128,489, Sep. 28, 1993, Pat. No. 5,454,758.

[30] Foreign Application Priority Data

Sep. 28, 1992 [DE] Germany ............... 42 32 450.5

[51] Int. Cl.$^6$ ..................... A01F 12/10
[52] U.S. Cl. ................ 460/70; 56/14.6
[58] Field of Search ............ 460/68, 66, 69, 460/70, 75, 80; 56/14.5, 14.6

[56] References Cited

U.S. PATENT DOCUMENTS

| | | | |
|---|---|---|---|
| 4,291,709 | 9/1981 | Weber et al. | 460/70 |
| 4,875,890 | 10/1989 | Margerum et al. | 460/68 |
| 4,881,920 | 11/1989 | Heidjann | 460/69 X |
| 4,957,467 | 9/1990 | Zachary | 460/69 |
| 4,969,853 | 11/1990 | Coers | 460/69 X |
| 5,078,646 | 1/1992 | Claas et al. | 460/70 X |

FOREIGN PATENT DOCUMENTS

5000018  1/1993  Japan ............... 460/70

*Primary Examiner*—Terry Lee Melius
*Attorney, Agent, or Firm*—Michael J. Striker

[57] ABSTRACT

A self-propelling harvester thresher has a cutting and transporting unit, a threshing unit having a threshing basket and a threshing drum, a transferring drum and a separating unit having a separating rotor and a separating housing with a drawing-in opening. The threshing drum has a plurality of threshing segments arranged on its periphery and offset relative to one another. The transferring drum is provided with a plurality of drivers arranged on a periphery of the transferring drum and offset relative to one another similarly to the threshing segments of the threshing drum. The drivers are formed as individual point-like elements which are spaced from one another in an axial direction and in a circumferential direction of the transferring drum and engage in a product accumulation in a point-like manner so as to loosen and to spread the product accumulation and transport parts of the product accumulation in a longitudinal direction of the harvester thresher while other parts of the material accumulation remain behind.

18 Claims, 10 Drawing Sheets

SELF-PROPELLING HARVESTER THRESHER

CROSS-REFERENCE TO RELATED APPLICATION

This application is a continuation-in-part of application Ser. No. 08/128,489, filed on Sep. 28, 1993, U.S. Pat. No. 5,454,758.

BACKGROUND OF THE INVENTION

The present invention relates to a self-propelling harvester thresher.

Self-propelling harvester threshers are known in the art. One such harvester thresher is disclosed, for example, in the German patent document DE 36 01 359 C2. This harvester thresher has a cutting mechanism trough and a subsequent inclined conveyor from which the harvested product is transported to a threshing unit operating in accordance with the principle of a radial flow and including a threshing basket and a threshing drum so a to supply the mainly threshed straw by a transferring drum to at least one separating unit which operates in accordance with the principle of an axial flow and includes a separating rotor and a separating housing. The transferring drum located after the threshing drum is partially surrounded by inlet plates which correspond to the outer active drum diameter, and transferring sheets are located after the inlet sheets so as to bridge the intermediate space between the inlet plates and the separating housing of the separating unit.

It has been recognized from praxis that the above-described harvester thresher generally operates in a satisfactory manner. However, in order to use it in all harvesting conditions a higher power consumption is required. The reason for this is that unavoidable product portions formed in the cutting table are not loosened before passing to the subsequent working and transporting elements. This causes loading peaks in the drive system and as a result the non-uniform, throughgoing product mat. In addition, grain losses occur, in that a fraction of grain leaves the harvesting machine as a compound with the product portions. The disadvantageous portion formation advances through the threshing drum and is further increased since the drum is provided with straight parallel threshing strips. When, for example, five strips distribute over the periphery are provided, then during one drum rotation they act with impact on the harvesting product, and compress, tear and further transport the harvesting product. A repetition of this process takes place during the product transfer on the transferring drum, independently of whether it is provided with parallel and straight strips as disclosed, for example, in the German document DE 32 14 161 A1, or with strips that have a curved shape as disclosed, for example, in the German document DE 36 01 359 C2. In both cases, no uniform and sufficient product loosening is obtained.

These strips provide a substantial lateral transporting action, and the lateral transporting direction and action are dependent on the lateral offset of the strips in their rotary direction. Therefore the strips are capable of displacing the product accumulation as a whole sideways.

SUMMARY OF THE INVENTION

Accordingly, it is an object of the present invention to provide a harvester thresher of the above-mentioned general type, which avoids the disadvantages of the prior art.

More particularly, it is an object of the present invention to provide a harvester thresher which is formed so that the harvested product passes through the machine uniformly and in loosened condition and the transfer of the product to the individual working stations is performed in a fine way so that clogging is avoided and the drive is protected from torque peaks and an optional grain separation is obtained.

In keeping with these objects and with others which will become apparent hereinafter, one feature of the present invention resides, briefly stated, in a harvester thresher in which the threshing drum has a plurality of threshing segments which are distributed over its periphery and arranged with an offset relative to one another, and the transferring drum in its region preceding the drawing-in opening of the separating housing is provided with drivers which are arranged, similarly to the threshing segments of the threshing drum so that they are distributed over the periphery and offset relative to one another. The drivers are formed as individual point-like elements which are spaced from one another in an axial direction and in a circumferential direction of the transferring drum.

Such an arrangement of drivers operates so that both the threshing drum and the transferring drum in their corresponding regions are efficient over their hole periphery uniformly for transportation, so that the product mat to be supplied is optimally loosened and uniformly distributed and transported. The torque peaks no longer occur and the grain losses are eliminated. The threshing drum is formed in an advantageous manner as a fully cylindrical hollow body, with which the threshing segments are connected through holders. Also the transferring drum can be formed as a fully cylindrical hollow body which in its region preceding the drawing-in opening of the separating housing is provided with drivers. When the drivers are formed as individual point-like elements which are spaced from one another in an axial direction and in a circumferential direction of the transferring drum, they act not in the lateral direction, but instead act on a product accumulation in a longitudinal direction. In particular, the point-like drivers engage in a point-like manner in the product accumulation and transport parts of the product accumulation in the longitudinal direction, while other parts of the product accumulation which are not engaged by the drivers acting in the point-like manner remain behind. Therefore, the acceleration of a partial quantity of the product accumulation is performed by the drivers in the longitudinal direction, contrary to the strips disclosed in the German document DE 36 01 359 C2 in which only lateral transporting action is produced in a transverse direction. In contrast, in the self-propelling harvester thresher in accordance with the present invention with the point-like drivers which are offset relative to one another in an axial direction and in a circumferential direction of the transferring drum, a loosening and spreading of an available product accumulation is performed.

In accordance with a further important feature of the present invention, the separating rotor of the separating unit is provided with saw-tooth-like strips. Each n-th-tooth of one strip is raised relative to the other strips and n corresponds to the number of strips placed on the rotor, and offset so that the raised teeth of all strips form a line which surrounds the rotor helically. Such an arrangement forms so that the loosened and uniformly supplied harvested product also passes the separating unit as a uniformly loosened product mat. The product mat is in particular engaged in two planes and is formed on the one hand in a rotary plane formed by the lower teeth, and on the other hand by the rotary plane formed by the higher teeth. As a result, in the dry region for the separating unit, no high torque peaks and no product portions with so-called corn inclusions are produced.

The rotary speed of the threshing drum, the transferring drum and the separating rotor has a permanently same ratio so that a uniform throughflow is guaranteed. For adaptation to different fruit types or harvesting conditions, it is especially advantageous to drive all three rotors over a joint V-belt regulating transmission.

For reduction of the structural length, the threshing drum and the transferring drum can be formed as a unit composed of a cylindrical base body. This base body in its region preceding the drawing-in opening of the separating housing is provided with offset drivers, and the cylindrical base body is provided with threshing segments located at both sides near the drawing-in opening and helically surrounding the base body.

The efficiency of the machine can be increased when in accordance with the present invention, the cylindrical base body in both regions in which it is provided with the threshing segments, has striking strips which can extend, for example, inclinedly to the supply direction of the harvested product.

Depending on the type of the product to be harvested, it can be advantageous to form the threshing strips not integrally, but instead as several threshing elements arranged one behind the other.

For obtaining the transfer of the product for the separating device operating in accordance with the principle of the axial flow in a fine manner, the machine in accordance with an important feature of the present invention, has the inlet plates which at their front edges as seen in the rotary direction of the transferring drum, have edges which are smaller than the rear edges. Therefore, the facing edges of the inlet plates as considered in the rotary direction of the transferring drum initially have their maximum distance so as to run then to their minimum distance from each other. In this way, the harvested product when it reaches the inlet opening of the separating unit, is drawn in softly and substantially at that half-height of the inlet opening approximately completely. The reason is that on one side, the inlet plate in this region is small and the following transferring sheets which bridge the space between the inlet plate and the separating housing are relatively long, so that the direction deviation of the harvested product does not occur abruptly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
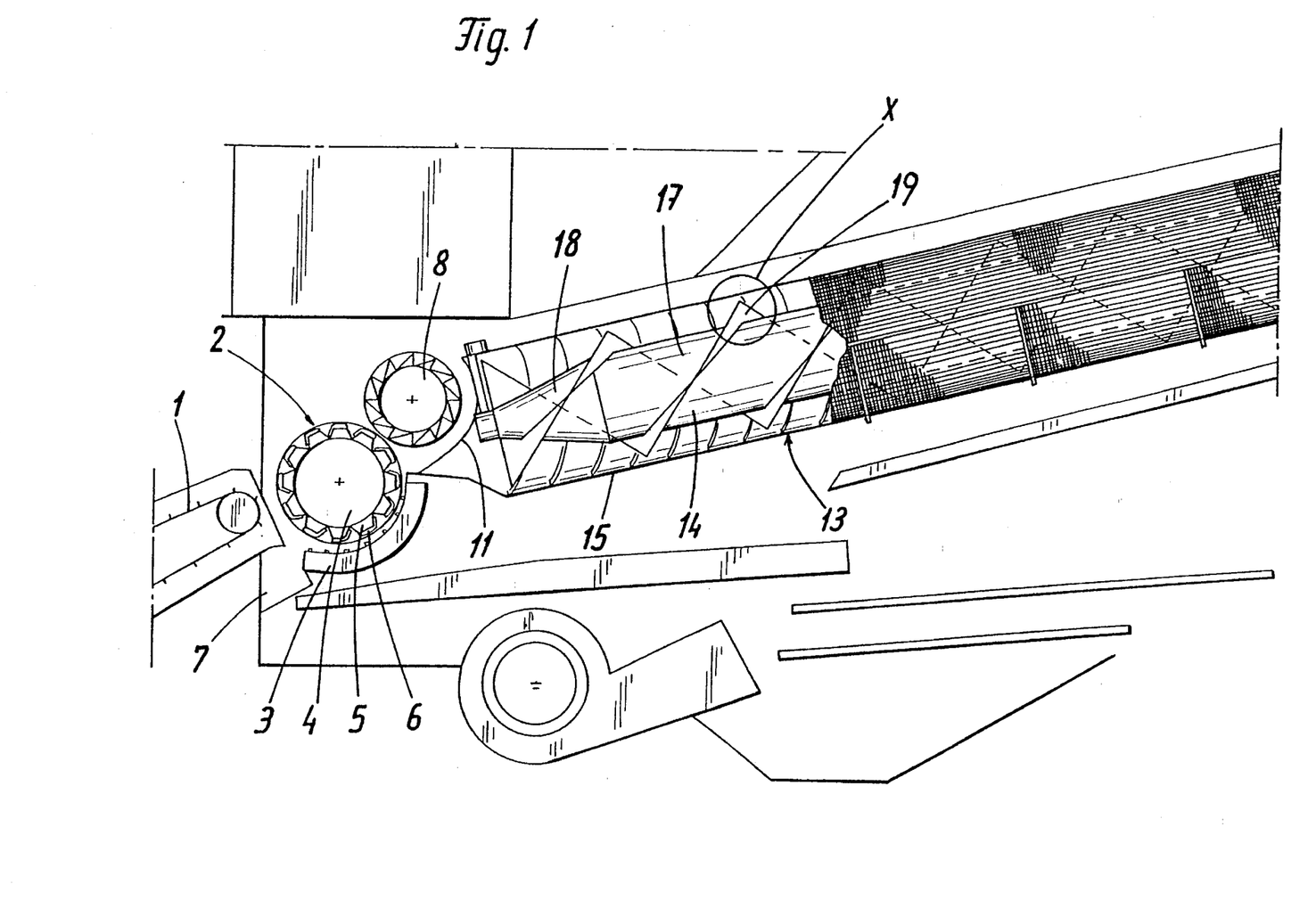
FIG. 1 is a side view of a threshing and separating part of a self-propelling harvester thresher in accordance with the present invention.

A self-propelling harvester thresher in accordance with the present invention has an inclined conveyor which is identified with reference numeral 1 and supplies the harvested product to a threshing mechanism 2 arranged transversely to the travelling direction. The threshing mechanism 2 includes a threshing basket 3 and a threshing drum 4. The threshing drum 4 is formed as a fully cylindrical body with a plurality of holders 5 which are welded on it in offset arrangement. Depending on the type of the harvested product, differently formed threshing segments 6 can be screwed to the holders 5. The holders 5 with the threshing segments of the threshing drum 4 are offset relative to one another in an axial direction and in a circumferential direction of the threshing drum. When eventually rocks are transported by the inclined conveyor 1 together with the product stream, they are separated by a rock catching trough 7 located before the threshing mechanism 2 to prevent damage to the threshing mechanism.

Figure 2:
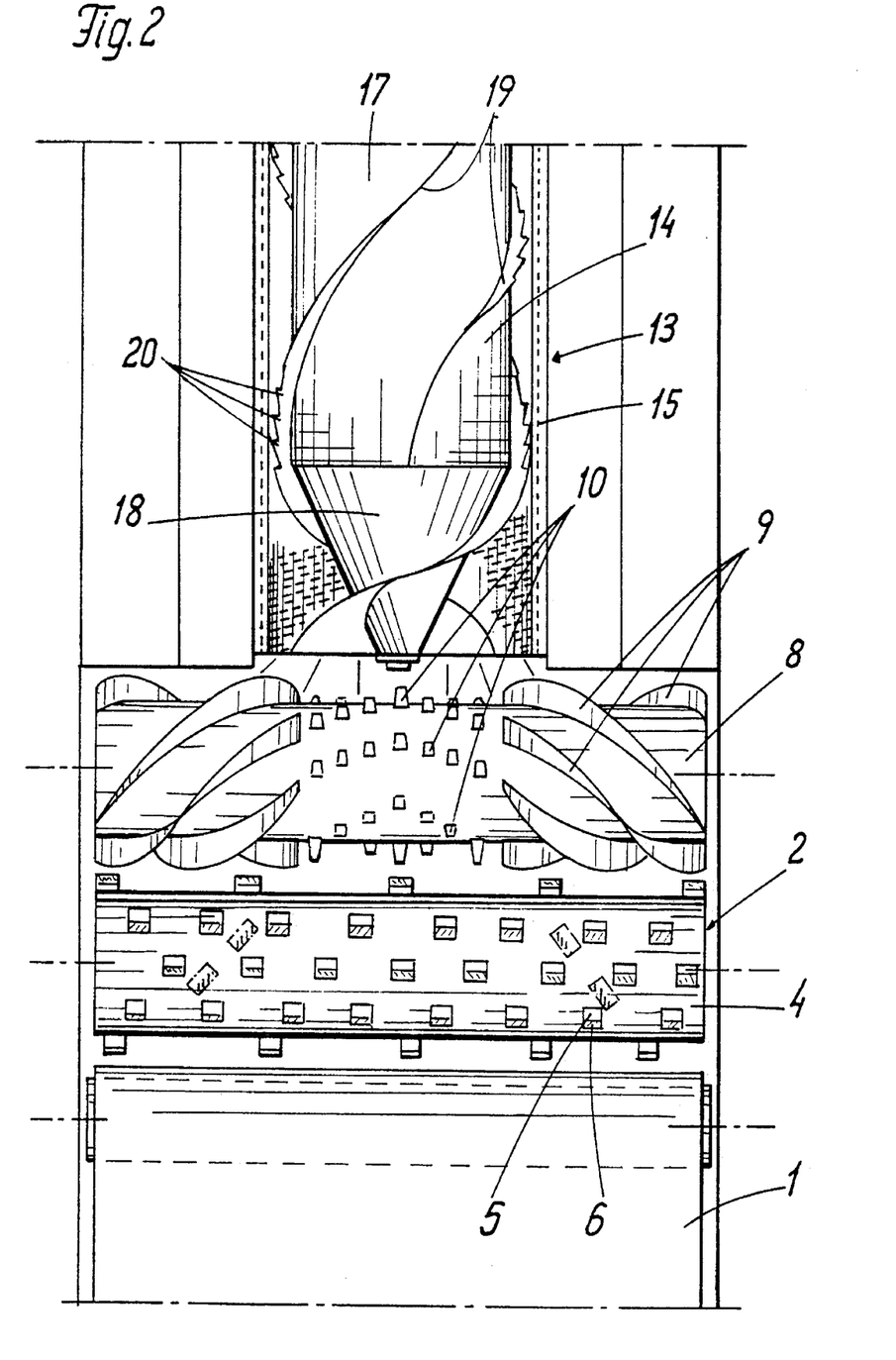
FIG. 2 is a plan view of the part shown in FIG. 1.
Figure 3:
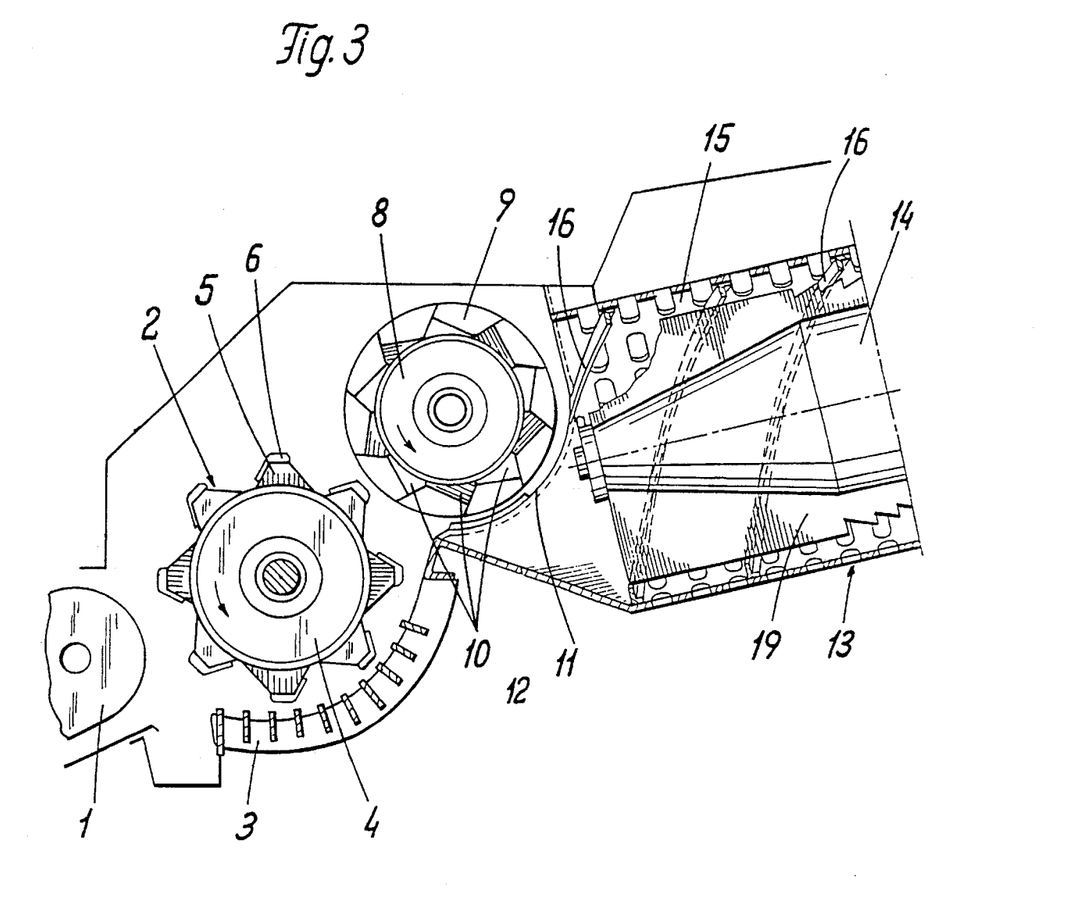
FIG. 3 is a front portion of the part shown in FIG. 1, on an enlarged scale.

The product stream which is partially threshed in a radial flow by the threshing mechanism and simultaneously supplied in a uniform fashion, is conveyed to a transferring drum 8 which immediately follows the threshing mechanism. The transferring drum 8, as shown in FIG. 2, is formed similarly to the threshing drum as a fully cylindrical drum. In its end regions, the transferring drum 8 is provided with plates 9 which guide the straw stream from outside inwardly, and in its central region it is provided with a plurality of drivers 10 which are offset relative to one another. More particularly, the drivers 10 are formed as point-like elements which are offset relative to one another in an axial direction and in a circumferential direction of the transferring drum. The point-like drivers 10 act on the product accumulation in a point-like manner and transport the parts of the product accumulation in a longitudinal direction while other parts of the product accumulation which are not engaged in a point-like manner by the drivers 10 remain behind. The point-like drivers 10 perform loosening and spreading of the product accumulation.

The transferring drum is partially surrounded by an inlet plate 11. The inlet plate 11 is formed in correspondence with the outer active surface of the transferring drum. The inlet plate 11 is provided with guiding rails 12. A separating unit 13 is located after the transferring drum 8 and includes a separating rotor 14 and a separating housing 15. The inlet plate 11 with the guiding rails 12 prevents clogging in the region of the transfer to the separating unit 13. The product transfer from the transferring drum 8 to the separating rotor 14, as well as the product flow in the separating unit 13 is assisted by a guiding rail 16 arranged on the inner surface of the separating housing 15 in an offset arrangement.

Figure 5:
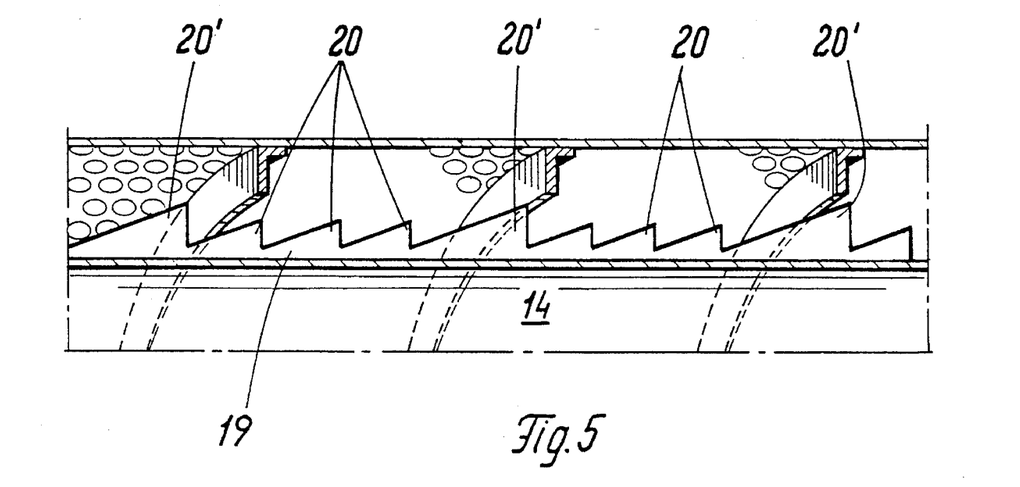
FIG. 5 is a view showing a portion identified with X in FIG. 1 on an enlarged scale, wherein strips are shown in rectilinear and extended form.
Figure 6:
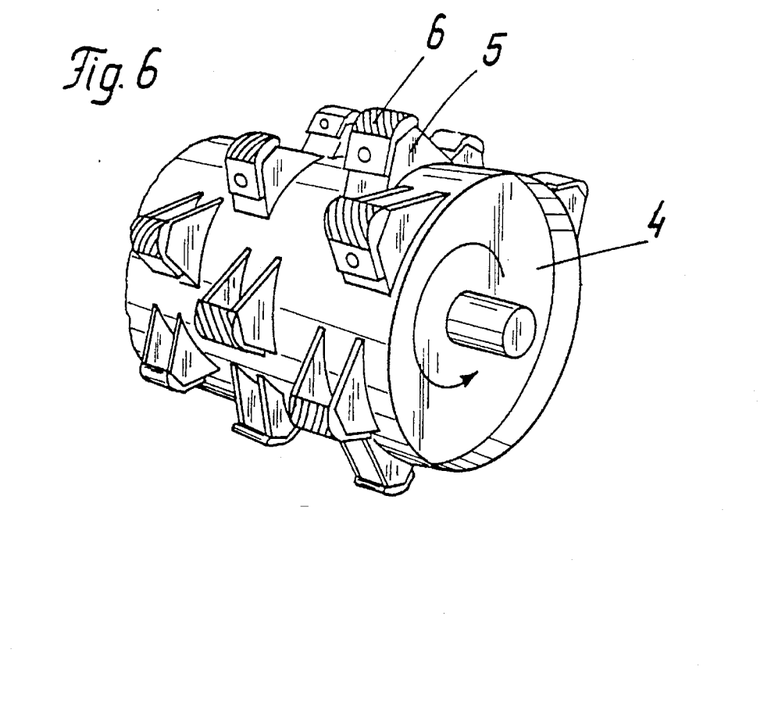
FIG. 6 is a perspective view of a threshing drum of the machine shown in FIG. 1.
Figure 7:
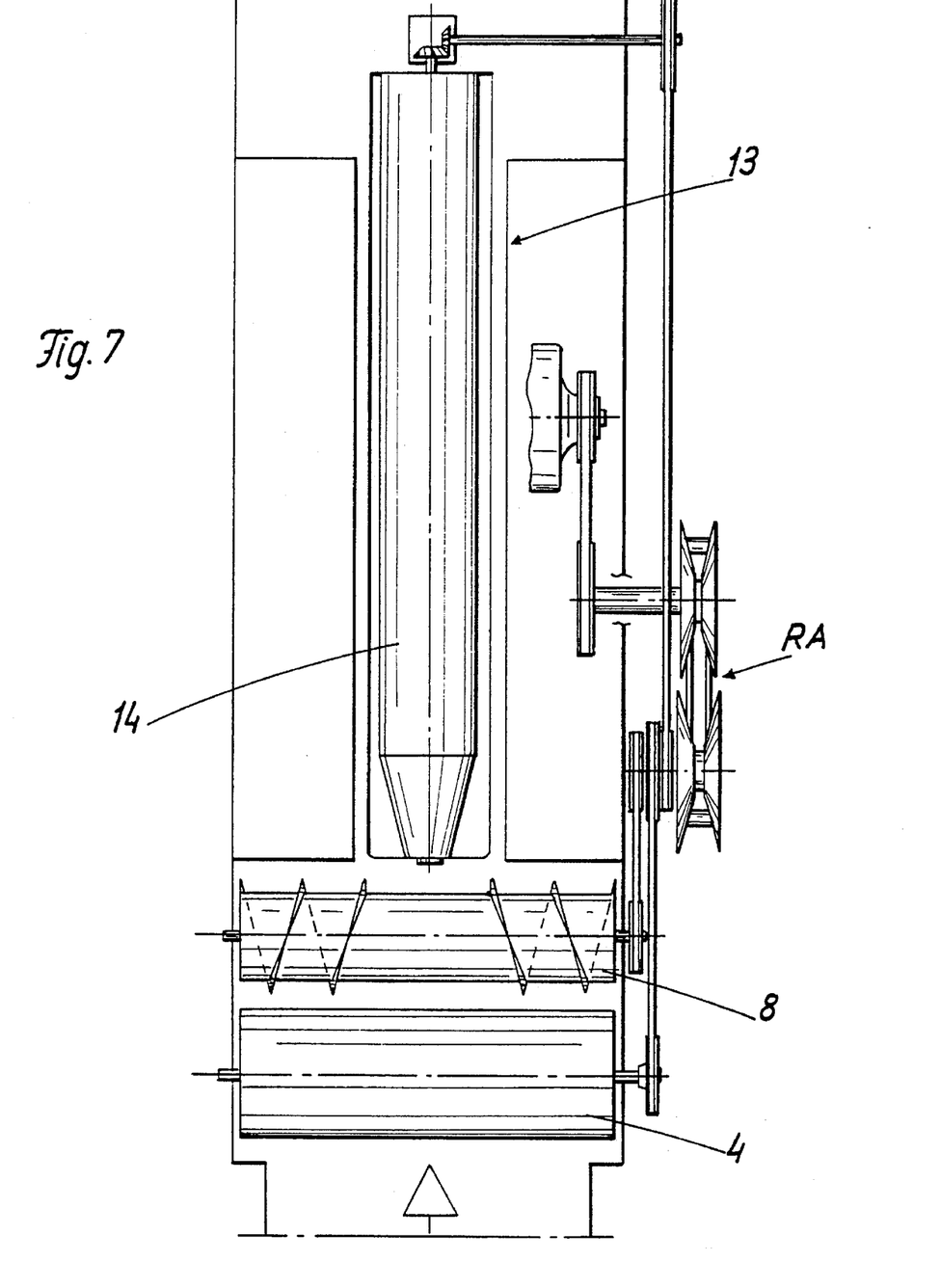
FIG. 7 is a drive diagram for a joint regulatable drive.

As can be seen from FIGS. 2 and 5, the rotor 14 has a fully cylindrical base body 17 which is provided on an inlet side with a truncated-cone-shaped projection 18. The projection 18 and the base body 17 are provided with a plurality of saw-tooth-shaped strips 19 which are uniformly distributed on the periphery. In the cylindrical region of the separating drum 14, they have a saw-tooth shape and extend in a helical course. From the teeth 20 of the strips 19, for example, each fourth tooth 20' of the strips is raised so that with respect to the raised teeth 20' for example, all four strips 19 have a helical course. Such an arrangement operates so that both the short teeth 20 and the long teeth 20' form a transporting plane. As a result, in addition to the transporting plane formed by the short teeth 20, a second higher transporting plane formed by the higher teeth 20' is provided and therefore a uniform, multi-layer product flow through the separating unit 13 is guaranteed.

Figure 4:
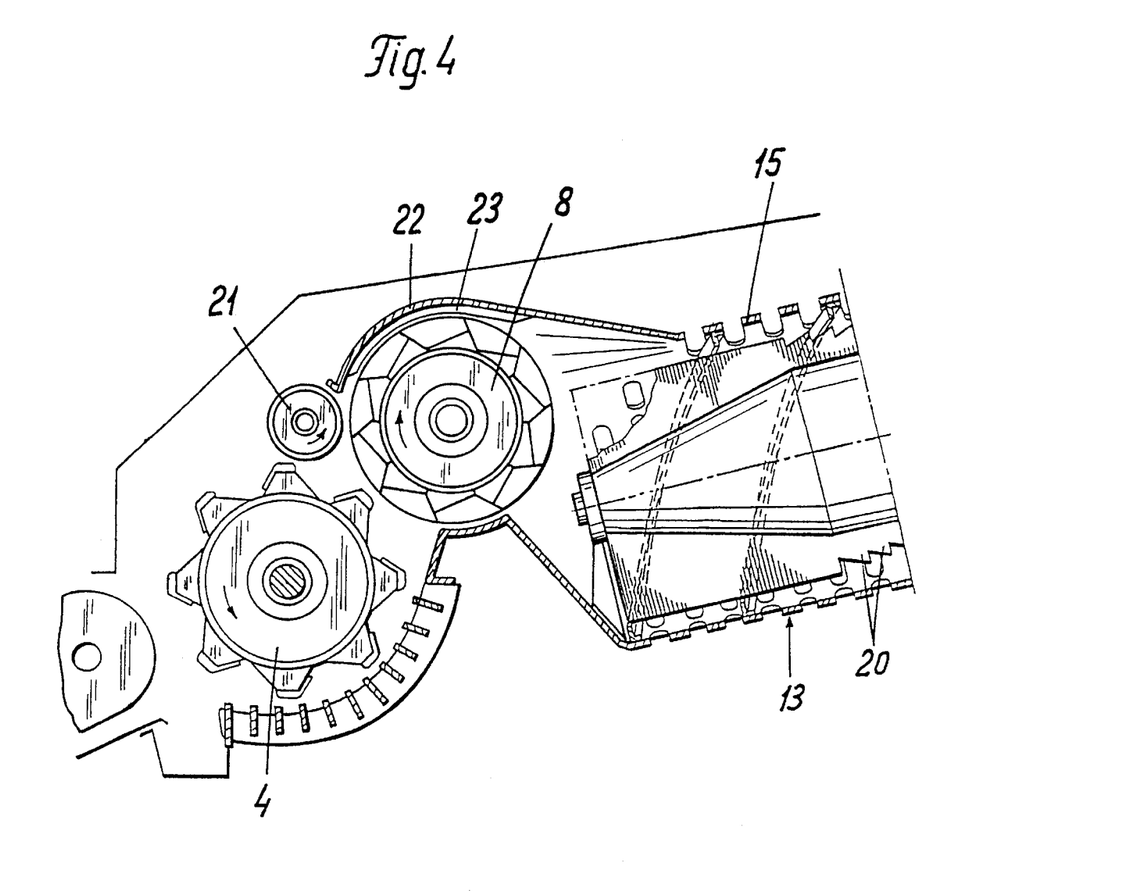
FIG. 4 is a view substantially corresponding tot he view of FIG. 3, but showing a further embodiment.

In FIG. 2, the threshing drum 4 and the transferring drum 8 operate both in the counter-clockwise direction, or in other words with undershot. Contrary to this, as shown in FIG. 4, the transferring drum 4 can operate opposite to the threshing drum 4 in a clockwise direction or in other words, operates with overhead. In this case it is necessary to provide a guiding drum 21 with preferably a smooth cylindrical surface so that the harvested product is transferred without problems from the threshing drum 4 to the transferring drum 8. The transferring drum is covered in the upper region by a guiding plate 22 which is connected with the separating housing 15. The guiding plate 22 can be provided with guiding rails 23.

Figure 8:
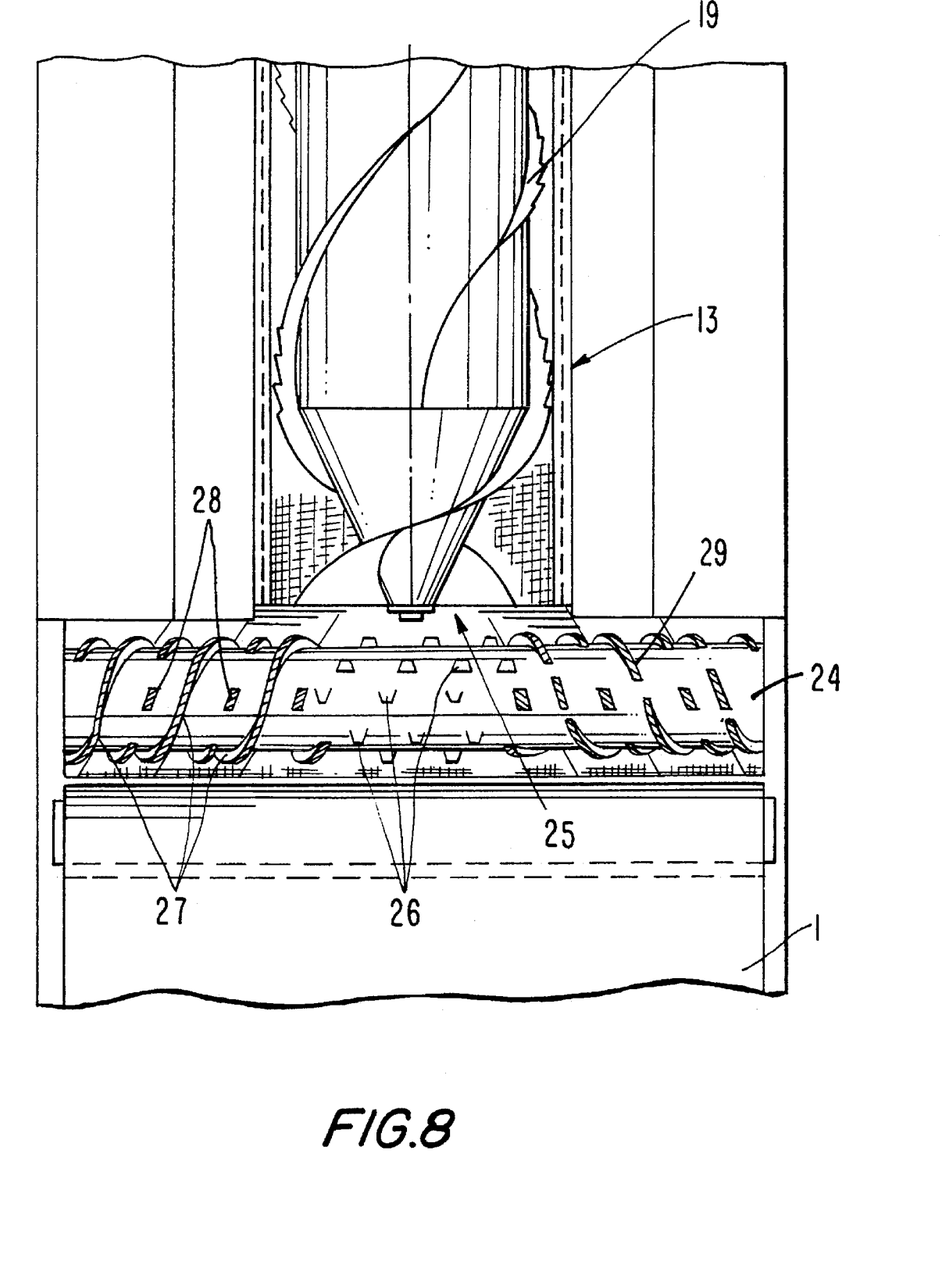
FIG. 8 is a view Showing a threshing and separating portion of FIG. 1 in a shortened structure.

As shown in FIG. 8, a cylindrical drum 24 is arranged between the inclined conveyor 1 and the separating unit 13. It performs the functions of both the threshing drum and the transferring drum. For this purpose, the cylindrical drum 22 is provided in its both regions preceding the drawing-in opening 26 of the separating unit 13 with a plurality of drivers 27 which are offset relative to one another. The base body 24 is provided with a! plurality of threshing strips 27 located at both sides near the drawing-in opening 26 and helically surrounding the base body. In the intermediate space between the threshing strips 27, impact strips 28 are arranged and preferably extend inclinedly to the supply direction of the harvested product. As can be seen at the right half of the Figure, the threshing strips 27 must not be made integrally. They can be composed of several threshing elements 29' arranged one behind the other in dependence on the type of the harvested product.

Figure 9:
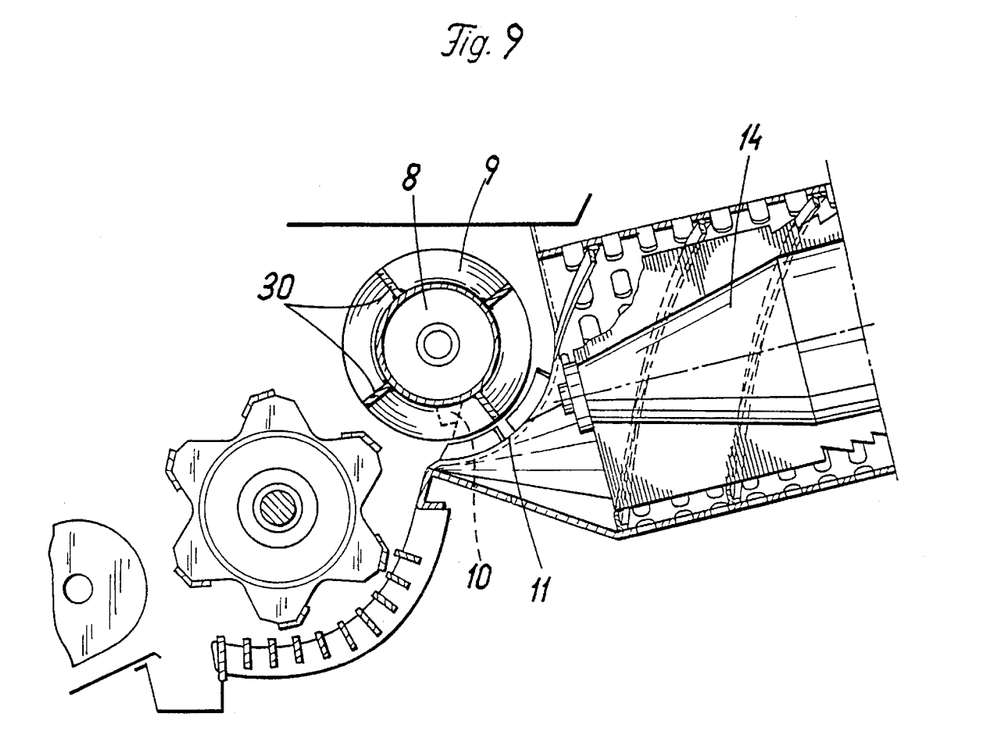
FIG. 9 is a view showing a threshing and separating portion of the part of FIG. 1 in accordance with a further embodiment of the invention.
Figure 10:
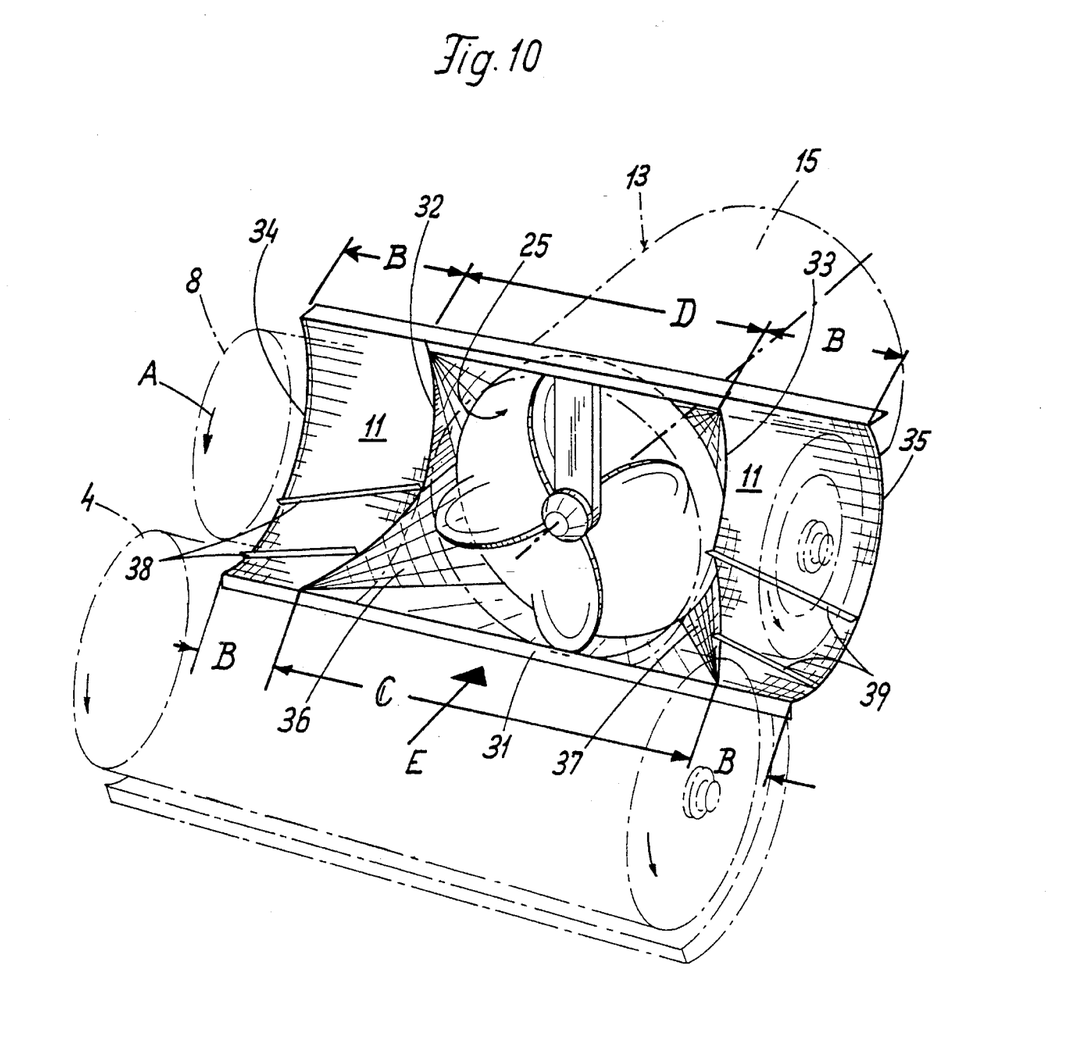
FIG. 10 is a perspective view of the structure of FIG. 9 with threshing and transferring drums and a separating drum shown in dashed-dotted lines.

FIGS. 9 and 10 show a further transferring zone provided between the transferring drum 8 and the separating unit 13 and positively influencing the product flow. The transferring drum 8, as in the German document OS-36 01 359, is provided in both of its end regions with screw helixes 9 which guide the straw stream from outside inwardly, and in its central region between the helixes with throwing plates 30 or drivers 10 extending parallel to the rotary axis of the transferring drum. They take over the further transportation of the product stream into the separating rotor 14'. As shown particularly in FIG. 10, the transferring drum 8' is partially surrounded by two inlet plates 11 arranged at both sides of the inlet opening 25 of the separating unit 13 and held by a frame 31. The width B of the inlet plate 11 is first small when considered in the rotary direction A of the transferring drum 8 and then grows to its large size. The distance between the facing edges 32 and 33 of the inlet plate 11 when considered in the rotary direction of the transferring drum 8' first has its greatest distance C and at the outlet side has its smallest distance D.

In the embodiment shown in FIG. 10, the distance C reduces uniformly to the value D which is reached substantially after the first half of the arc length of the inlet plate 11. In the region of the second half of the arc length of the inlet plate 11, the outer edges and the edges 32, 33 extend parallel to one another. It is to be understood that the inlet plate can also widen over its whole arc length uniformly or in a stepped manner. In each case the inner edges 32 and 33 and also the upper and lower limits of the frame 11 are connected with the separating housing 15 of the separating unit 13 through transferring plates 36 and 37. Since the edges 32 and 33 in the product inlet region E have a relatively great distance from one another, the product transfer in this region due to the transferring plate 36, 37 extending with a flat angle, is very soft and therefore intensive, so that the greatest part of the supplied product mat reaches the separating unit 13 in which the residual grain separation is performed in a known manner. The advantage of such a course of the inlet plate 11 or the transferring plate 36, 36 is first of all the soft product transfer from the transferring drum to the separating unit 13 and secondly that during a briefly increased product supply there is no clogging danger since in the inlet region E, the great part of the supply product is already drawn in and in the subsequent region, sufficient drawing-in reserves are available. The drawing-in is assisted by the guiding rails 38 and 39 provided on the inlet surfaces 11.

Figure 11:
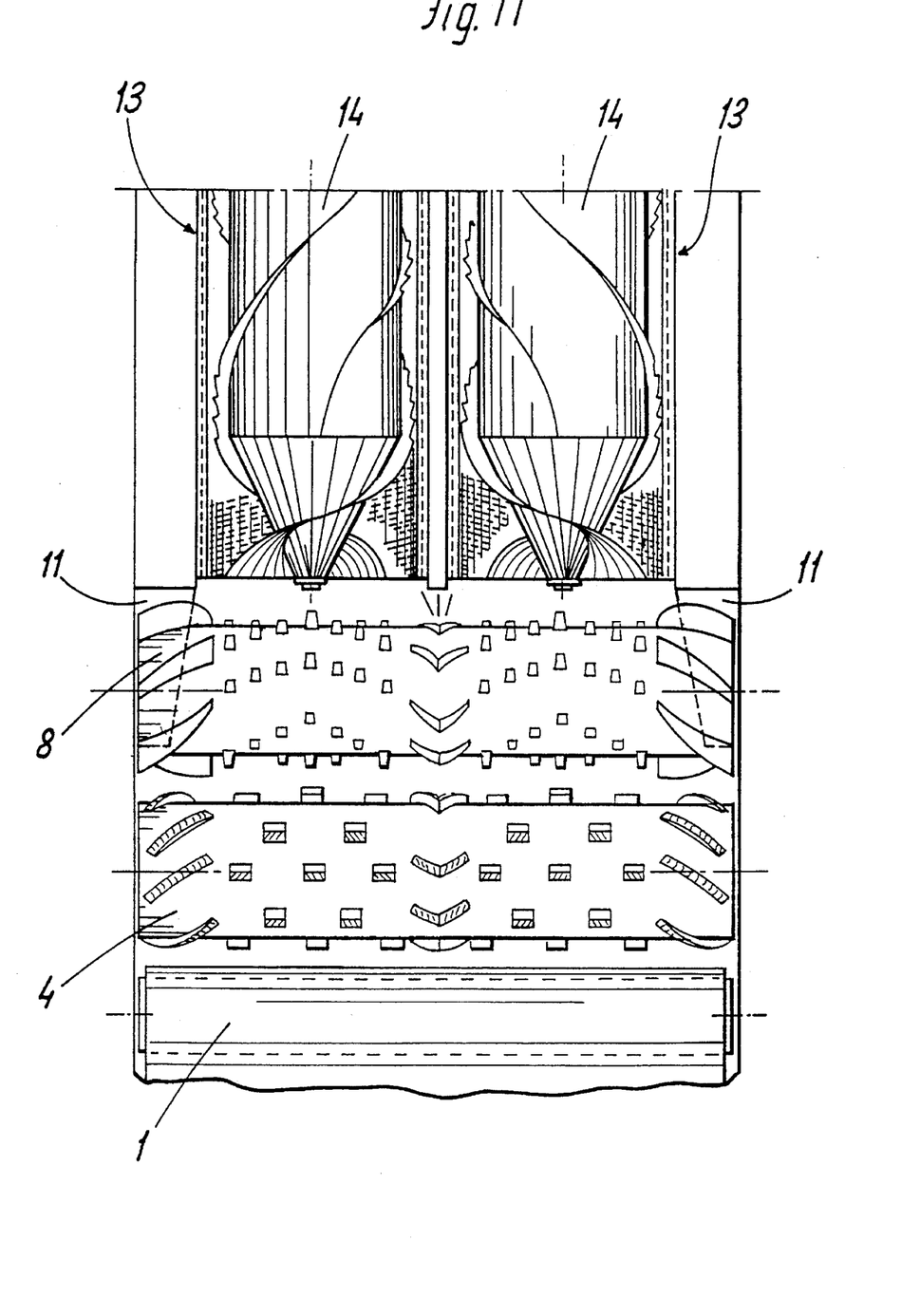
FIG. 11 is a view showing a region of the harvester thresher of FIGS. 1 and 2 formed as a double separating rotor device.

FIG. 11 shows a threshing and separating device with increased throughflow efficiency. For this purpose, the device has two separating rotors which are arranged relative to one another with parallel axes and each provided with an associated housing.

The construction of the threshing drum 4 and the subsequently arranged transferring drum 8 is selected in this embodiment so that the inflowing product stream is separated as much as possible and supplied to both of the separating rotors. For this purpose, both drums 4 and 8 are provided centrally between their ends with the threshing segments or drivers which separate the product stream. All the above-described features can be also utilized in the double separating rotor device.

It will be understood that each of the elements described above, or two or more together, may also find a useful application in other types of constructions differing from the types described above.

While the invention has been illustrated and described as embodied in a self-propelling harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A self-propelling harvester thresher, comprising means for cutting and transporting a harvested product; threshing unit arranged after said means and operating in accordance with the principle of radial flow, said threshing unit including a threshing basket and a threshing drum; a transferring drum arranged after said threshing unit for transferring substantially threshed straw; a separating unit transporting the harvested product in accordance with the principle of axial flow against a travelling direction of the harvester thresher, said separating unit including at least one separating rotor and a separating housing provided with a drawing-in opening, said threshing drum being provided with a plurality of threshing segments arranged on its periphery and offset relative to one another, said transferring drum in its region preceding said drawing-in opening of said separating housing being provided with a plurality of drivers which are arranged on a periphery of said transferring drum and are offset relative to one another similarly to said threshing segments of said threshing drum, said drivers being formed as individual point-like elements which are spaced from one another in an axial direction and in a circumferential direction of said transferring drum and engage in a product accumulation in a point-like manner so as to loosen and to spread the product accumulation and transport parts of the product accumulation in a longitudinal direction of the harvester thresher while other parts of the material accumulation remain behind.

2. A harvester thresher as defined in claim 1, wherein said cutting and transporting means include a cutting mechanism trough and a subsequently arranged inclined conveyor.

3. A harvester thresher as defined in claim 1; and further comprising a plurality of inlet plates partially surrounding said transferring drum and corresponding to an outer diameter of the latter, and a plurality of transferring plates which follow said inlet plate and cover an intermediate space between said inlet plate and said separating housing of said separating unit.

4. A harvester thresher as defined in claim 1, wherein said threshing drum is formed as a fully cylindrical body provided with a plurality of holders which connect said body with said threshing segments.

5. A harvester thresher as defined in claim 1, wherein said transferring drum is formed as a fully cylindrical body provided with said drivers in a region preceding said drawing-in opening of said separating housing.

6. A harvester thresher as defined in claim 1, wherein said separating rotor of said separating unit is provided with saw-tooth-shaped strips having a plurality of teeth, each n-th tooth of one of said strips being raised relative to another of said strips and n corresponds to a number of said strips arranged on said separating rotor so that said raised teeth of all said strips form a line which helically extends over said rotor.

7. A harvester thresher as defined in claim 1; and further comprising drive means arranged so that rotary speeds of at least two of said threshing drum, said transferring drum and said separating rotor have a permanent ratio; and a joint belt regulating transmission operative for changing said rotary speeds.

8. A harvester thresher as defined in claim 1, wherein said threshing drum and said transferring drum are formed as a unit including a cylindrical base body provided with said drivers in said region preceding said drawing-in opening of said separating unit, said cylindrical base body at both sides of said drawing-in opening being also provided with threshing strips helically arranged on said base body.

9. A harvester thresher as defined in claim 8, wherein each of said threshing strips is composed of a plurality of pressing elements arranged behind one another.

10. A harvester thresher as defined in claim 8, wherein said cylindrical base body in both regions in which it is provided with said threshing strips is also provided with impact strips arranged in corresponding points.

11. A harvester thresher as defined in claim 10, wherein said impact strips extend inclinedly to a supply direction of the harvested product.

12. A harvester thresher as defined in claim 3, wherein said inlet plates as considered in a rotary direction of said transferring drum have front edges and rear edges and are formed so that said inlet plates are smaller at said front edges than at said rear edges.

13. A harvester thresher as defined in claim 12, wherein said inlet plates have facing edges which, when considered in a rotary direction of said transferring drum are arranged initially at a greatest distance from one another and then extend to a smallest distance from one another.

14. A harvester thresher as defined in claim 3, wherein said inlet plates are provided with guiding rails only over portions of said inlet plates.

15. A harvester thresher as defined in claim 3, wherein said inlet plates have facing edges which substantially cover a second half of their peripheral surface as considered in a rotary direction of said transferring drum extend parallel to one another and are spaced from one another by a smallest distance.

16. A harvester thresher as defined in claim 1, wherein said separating unit also has another separating rotor, and another separating housing associated with said another separating rotor, said separating rotors extending so that their axes are parallel relative to one another and rotating in opposite directions.

17. A harvester thresher as defined in claim 1, wherein said separating unit further has another separating rotor, said separating housing being a joint housing for both said separating rotors, said separating rotors rotating in a same direction.

18. A harvester thresher as defined in claim 1, wherein said threshing segments of said threshing drum are offset relative to one another in an axial direction and in a circumferential direction of said threshing drum.

* * * * *